(12) United States Patent
Shimizu et al.

(10) Patent No.: US 11,766,985 B2
(45) Date of Patent: Sep. 26, 2023

(54) AIRBAG DEVICE

(71) Applicant: Autoliv Development AB, Vargarda (SE)

(72) Inventors: Takayuki Shimizu, Kanagawa (JP); Atsushi Nakashima, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 17/753,041

(22) PCT Filed: Jun. 30, 2020

(86) PCT No.: PCT/JP2020/025733
§ 371 (c)(1),
(2) Date: Feb. 16, 2022

(87) PCT Pub. No.: WO2021/033433
PCT Pub. Date: Feb. 25, 2021

(65) Prior Publication Data
US 2022/0289134 A1    Sep. 15, 2022

(30) Foreign Application Priority Data

Aug. 21, 2019   (JP) .................................. 2019-151598

(51) Int. Cl.
*B60R 21/231* (2011.01)
*B60R 21/207* (2006.01)
*B60R 21/233* (2006.01)

(52) U.S. Cl.
CPC ...... *B60R 21/23138* (2013.01); *B60R 21/207* (2013.01); *B60R 21/233* (2013.01);
(Continued)

(58) Field of Classification Search
CPC ........... B60R 21/23138; B60R 21/207; B60R 2021/23146; B60R 2021/23324;
(Continued)

(56) References Cited

U.S. PATENT DOCUMENTS

| 5,913,536 A | 6/1999 | Brown |
| 2003/0155751 A1* | 8/2003 | Aulbach ........... B60R 21/23138 280/730.2 |

(Continued)

FOREIGN PATENT DOCUMENTS

| CN | 108297819 A | 7/2018 |
| CN | 109895726 A | 6/2019 |

(Continued)

OTHER PUBLICATIONS

Kippelt et al. DE 19529829 Head and thorax protection airbag for vehicles, English Machine translation, ip.com (Year: 1995).*

(Continued)

*Primary Examiner* — Karen Beck
(74) *Attorney, Agent, or Firm* — Harness, Dickey & Pierce, P.L.C.; Stephen T. Olson

(57) ABSTRACT

An airbag device installed in a vehicle seat having a seat cushion forming the seat surface and a seatback forming the backrest, and an inflator that generates expansion gas and an airbag that is deployed by the expansion gas released from said inflator. The airbag includes a pair of left and right side chambers that deploy forward from the side of the seatback and primarily protect the occupant's waist to shoulders, and an upper chamber that is continuous with the side chambers, deploys forward above the side chambers, and mainly protects the occupant's neck and head. On the left and right sides of the seatback, the location on the side where the seatbelt crosses near the shoulder is the first side, and the (Continued)

side opposite to said first side is the second side. A recess is formed on the first side of the airbag where the seatbelt fits.

16 Claims, 9 Drawing Sheets

(52) U.S. Cl.
CPC ............... *B60R 2021/23146* (2013.01); *B60R 2021/23324* (2013.01)

(58) Field of Classification Search
CPC ........... B60R 2021/23308; B60R 2021/23316; B60R 21/231; B60R 21/2334; B60R 21/26
See application file for complete search history.

(56) References Cited

U.S. PATENT DOCUMENTS

| | | | |
|---|---|---|---|
| 2018/0194317 A1 | 7/2018 | Barbat et al. | |
| 2020/0114858 A1* | 4/2020 | Henriksson | B60R 21/26 |
| 2021/0039581 A1* | 2/2021 | Nakajima | B60R 21/23138 |

FOREIGN PATENT DOCUMENTS

| | | | | |
|---|---|---|---|---|
| CN | 110087965 A | | 8/2019 | |
| DE | 19529829 C1 | * | 10/1996 | ....... B60R 21/23138 |
| DE | 10142819 A1 | * | 4/2003 | ....... B60R 21/23138 |
| DE | 202006010878 U1 | * | 10/2006 | ....... B60R 21/23138 |
| JP | 10-315891 A | | 2/1998 | |
| JP | 11-510765 A | | 9/1999 | |
| JP | 2004-314797 A | | 11/2004 | |
| JP | 2004314797 A | | 11/2004 | |
| JP | 2006-88844 A | | 4/2006 | |
| WO | 2018/114723 A1 | | 6/2018 | |
| WO | WO-2018114723 A1 | * | 6/2018 | ........... B60R 21/207 |

OTHER PUBLICATIONS

Alenspach et al. WO 2018/114723 Air bag device and vehicle seat provided with an airbag device, English Machine Translation, ip.com (Year: 2018).*

Office Action and translation received in corresponding Chinese application No. 2020800539932, dated Apr. 14, 2023.

* cited by examiner (A)

Shape when deployed (B)

Shape when deployed (A) Embodiment 1

(B) Embodiment 2

Embodiment 3

Embodiment 4 (Rear)

AIRBAG DEVICE

TECHNICAL FIELD

The present invention relates to an airbag device equipped in a vehicle seat. In particular, the present invention relates to an airbag device that can reliably restrain the occupant in question regardless of the posture of the occupant seated in the seat.

BACKGROUND ART

In order to protect passengers in the event of a vehicle collision, it is well known that vehicles are equipped with one or a plurality of airbags. These airbags include, for example, various forms such as: a so-called driver airbag which is deployed from near the center of the steering wheel so as to protect the driver; a curtain airbag which is deployed downward on the inner side of the window of an automobile so as to protect occupants during collisions in the transverse direction of a vehicle, as well as when overturning and during rollover accidents; and a side airbag which is deployed between the occupant and the side panel so as to protect the passenger upon impact in the transverse direction of a vehicle.

In recent years, with the advancement of automatic driving technology in vehicles, it is expected that the orientation of the seat will not be fixed, but will be configured to be rotatable, for example, to the front, back, left, and right. In addition, the occupant will likely adopt various seating postures, such as a relaxed posture with the seat greatly reclined, and the occupant must be suitably protected in such situations.

However, the well-known side airbag devices installed in vehicle seats have a structure that deploys airbags from one or both sides of the seat toward the front, enabling restraining occupants only within a limited range, and properly protecting occupants in various postures is difficult.

SUMMARY OF THE INVENTION

Problem to be Solved by the Invention

The present invention has been created in view of the abovementioned problems, an object thereof is to provide an airbag device that may reliably restrain the occupant regardless of the posture of the occupant seated in the seat.

Means for Solving the Problem

The following describes means for solving the abovementioned problem and the effect thereof. In the present invention, when an occupant is seated in a seat in a regular posture, the direction the occupant faces is referred to as the "front," the opposite direction is referred to as the "rear," and the direction indicating the coordinate axis is referred to as the "front-to-back direction." Moreover, when the occupant is seated in the seat in a regular posture, the right of the occupant is referred to as "right direction," the left of the occupant is referred to as "left direction," and the direction indicating the coordinate axis is referred to as the "left-right direction." Similarly, when the passenger is seated in the seat in a regular posture, the head direction of the passenger is referred to as "up," the waist direction of the passenger is referred to as "down," and the direction indicating the coordinate axis is referred to as the "vertical direction."

In order to achieve the purpose described above, the present invention is an airbag device installed in a vehicle seat having a seat cushion forming the seat surface and a seatback forming the backrest, and includes an inflator that generates expansion gas and an airbag that is deployed by the expansion gas released from said inflator. The airbag includes a pair of left and right side chambers that deploy forward from the side of the seatback and primarily protect the occupant's waist to shoulders, and an upper chamber that is continuous with the side chambers, deploys forward above the side chambers, and mainly protects the occupant's neck and head. Furthermore, on the left and right sides of the seatback, the location on the side where the seatbelt crosses near the shoulder is the first side, and the side opposite to said first side is the second side. A recess is formed on the first side of the airbag where the seatbelt fits.

With the present invention, the airbag includes a pair of left and right side chambers, which deploy forward from the side of the seatback and primarily protect the waist to the shoulders of the occupant, and an upper chamber, which is continuous with the side chambers and deploys forward above the side chambers and primarily protects the neck and head of the occupant. The airbag deploys in a dome shape and covers the entire upper part of an occupant from the side to the upper part of an occupant seated in the seat. As a result, the airbag can reliably restrain movement of the occupant at least in the left-right direction, upward, and diagonally upward, and provide suitable protection from the head to the waist of the occupant.

In addition, since the airbag has a recess formed where the seatbelt fits on the first side where the seatbelt crosses, the seatbelt enters the recess when the airbag deploys, and airbag deployment is not hindered by the presence of the seatbelt. As a result, a continuous dome-shaped airbag that integrally covers from the side to the top of the seat can be achieved. Furthermore, since the position of the airbag is secured by the seatbelt that enters the recess, the seatbelt itself functions as a means of holding the airbag in place, thus enabling the airbag to maintain favorable deployment behavior and shape.

In the present invention, a "pair of left and right" side chambers does not necessarily mean the left and rights sides are symmetrical in shape, but molding into an asymmetrical shape is also feasible. The term "seatbelt fits" includes and means the state in which the seatbelt enters the recess in a relative manner, at least in the initial stage of airbag deployment.

The recess can be a slit that extends in the front-to-back direction when the airbag is deployed. The advantage of slits is that they can be easily formed by cutting and sewing the panels that make up the airbag. In addition, forming a recess that is wider than necessary will reduce the capacity of the airbag by that amount, so by using a relatively narrow slit, the effect on the reduction of airbag capacity can be minimized. Furthermore, by making the recess a relatively narrow slit, the airbag does not fall apart around the slit, and favorable restraint performance can be maintained. The front-to-back direction in which the slit extends can be said to generally coincide with the direction in which the airbag deploys (forward).

The slit can be configured to include a horizontal slit area extending in the front-to-back direction when the airbag deploys, and a vertical slit area extending upward from the rear end of the horizontal slit area, forming a horizontal L-shape when viewed from the vehicle width direction.

The slit can also be configured to include a horizontal slit area extending in the front-to-back direction when the airbag deploys, and a vertical slit area extending up and down from the rear end of the horizontal slit area, forming a horizontal T-shape when viewed from the vehicle width direction.

Thus, by forming a vertical slit area in addition to the horizontal slit area, the seat belt advancing from the front end of the horizontal slit area will enter and be retained in the vertical slit area when the seat belt reaches the rearmost part of the horizontal slit area. This means that the pressure of the airbag does not dramatically expel the seatbelt along the horizontal slit area, thus maintaining the restraint function of the seatbelt for the occupant.

The horizontal slit area can be molded into a tapered shape that narrows from the front end toward the rear. By widening the front end of the horizontal slit area, the opening through which the seat belt enters can be increased in size, enabling the seatbelt to be securely captured.

The airbag can be configured so that the deployment of the recess is restricted by the seat belt during the initial stage of airbag deployment, after which the recess is opened as the internal pressure of the airbag increases, allowing the expansion gas to flow from the side chamber on the first side into the upper chamber.

Since the deployment of the recess is restricted in the initial stage of airbag deployment, the side chambers deploy first and can quickly restrain the occupant's movement in the left and right directions.

The upper part of the pair of side chambers can be connected by the upper chamber.

The upper chamber can include a first region in fluid communication with the side chamber on the first side and a second region in fluid communication with the side chamber on the second side, and these first and second regions can be fluidly separated from each other.

In this case, the inflator should be a pair of inflators stowed in each of the pair of side chambers. The expansion gas released from the pair of inflators can then be configured to flow from each of the pair of side chambers into the first and second regions of the upper chamber.

By dividing the upper chamber into the first region and second region, the airbag as a whole appears to be divided into two parts, left and right, and deployment of the left and right chambers (airbag) can be controlled independently.

In a separate aspect, the upper chamber can include a first region in fluid communication with the side chamber on the first side and a second region in fluid communication with the side chamber on the second side, and these first and second regions can be in fluid communication with each other.

In this case, the inflator shall be stowed in the side chamber, at least on the first side. The expansion gas released from the inflator can then be configured to flow from the first side chamber, through the first region and second region of the upper chamber, and into the second side chamber.

The upper chamber and the side chambers on both left and right sides are completely fluidly connected, and the expansion gas flows from the side chamber on the first side through the upper chamber into the side chamber on the second side. Therefore, when the airbag deploys, the first side chamber deploys first, then the upper chamber, and then the second side chamber. For example, in the event of a side collision to the first side (near side), initial deployment of the first side chamber can protect the occupant quickly.

The recess can be formed on the second side in addition to the first side. This structure allows vehicle seats equipped with such airbag devices to be installed regardless of their position, such as near-side or far-side, thereby improving their versatility.

The inflator can include a rear inflator that is stowed in the back of the seatback. An inflator arranged on the back enables flexible adjustment of the expansion gas flow path using a prescribed gas guide, and since there is relatively more space at the back of the seatback, an inflator with a larger capacity can be used.

A configuration enabling causing the expansion gas emitted from the inflator to flow into at least one of the first side chamber or the second side chamber is feasible.

BRIEF DESCRIPTION OF THE DRAWINGS

FIG. 1(A) illustrates a view from the side of the vehicle in the left-right direction, and FIG. 1(B) illustrates a view from the front. Note, the vehicle seat is illustrated as see-through.

FIG. 2(A) is a plan view illustrating the state in which the airbag is unfolded (state prior to being stowed). FIG. 2(B) is a front view illustrating the state in which the airbag is rolled (state when stowed).

FIG. 3(A) illustrates a view of the side of the vehicle in the left-right direction, and FIG. 3(B) illustrates a view from the front.

FIG. 4(A) illustrates the shape of the slit on the panel that makes up the airbag. FIG. 4(B) illustrates the shape of the slit with the airbag deployed.

FIG. 6(A) illustrates a state just after the airbag is deployed. FIG. 6(B) illustrates initial deployment state of the airbag. FIG. 6(C) illustrates full deployment state of the airbag.

DESCRIPTION OF THE PREFERRED EMBODIMENT

A vehicle seat according to an embodiment of the present invention will be described with reference to accompanying drawings. Note, the "front" indicated in each of the diagrams is the direction an occupant is facing when seated with a normal posture and facing the direction of travel, "back" is the direction opposite of "front", "inside" is inside in the vehicle width direction (occupant side), and "outside" is outside in the vehicle width direction (door panel side).

In addition, the same reference code is used for the same or corresponding structural elements in each of the embodiments and redundant descriptions thereof will be omitted.

Figure 1:
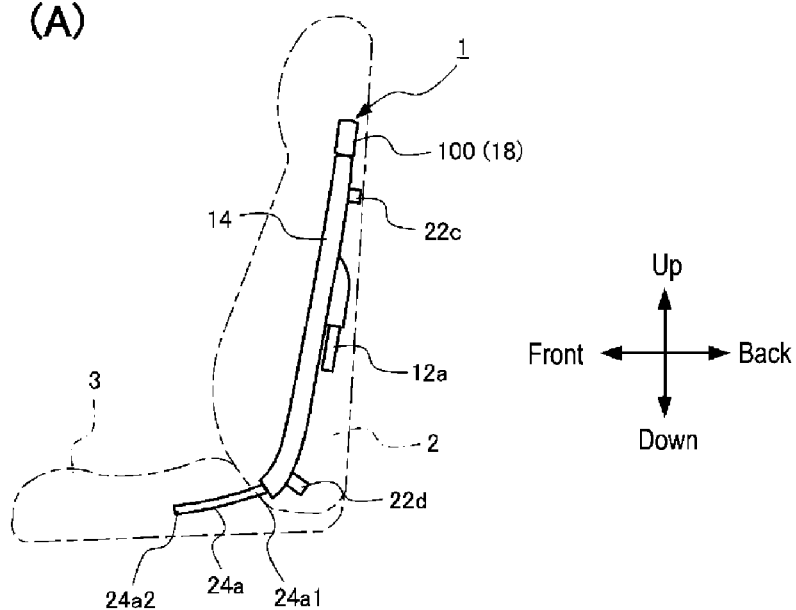
FIG. 1 illustrates a view of the airbag device according to the present invention installed in a vehicle seat.
Figure 1:
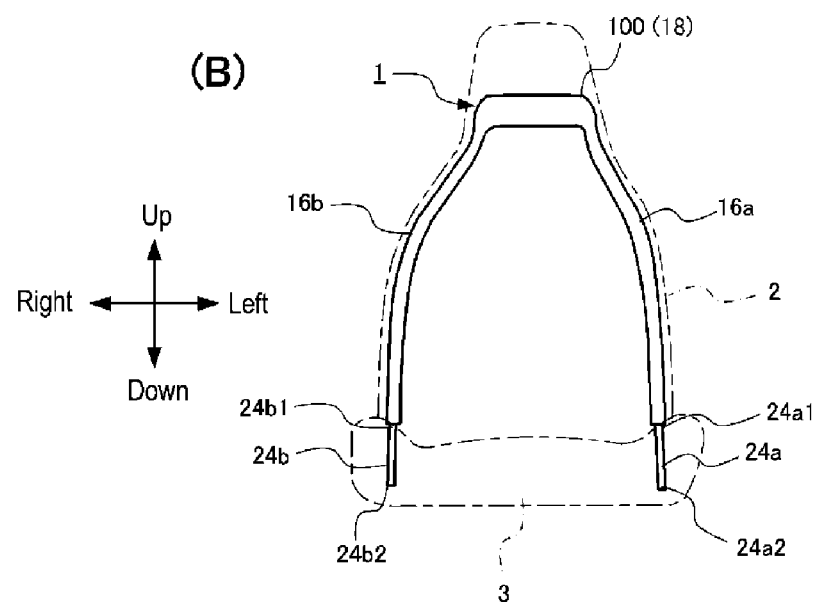
Figure 2:
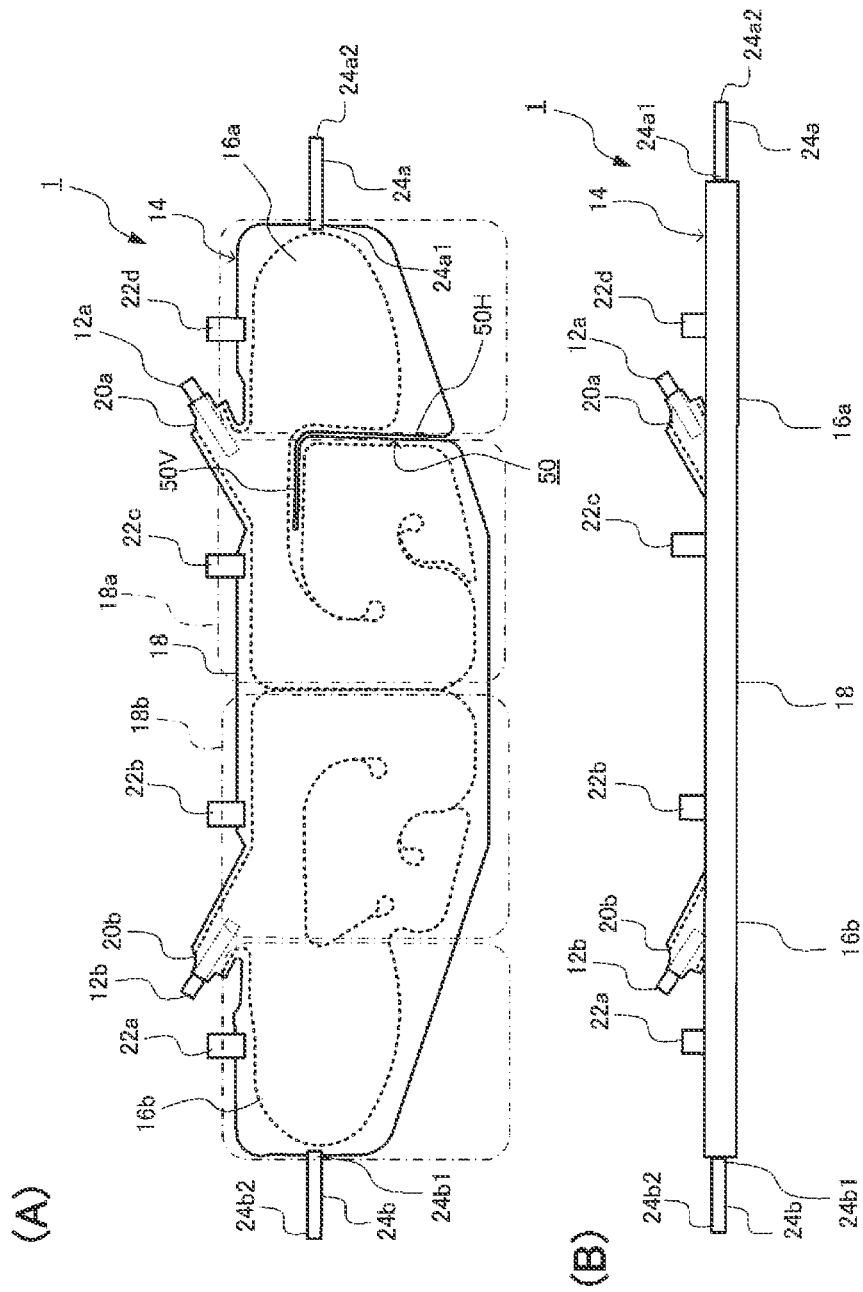
FIG. 2 illustrates the structure of an airbag used in the airbag device according to embodiment 1 of the present invention.

FIG. 1 is a side view (A) and front view (B) illustrating an airbag device 1 according to embodiment 1 of the present invention mounted in a vehicle seat (2, 3), where the vehicle seat (2, 3) is illustrated as see-through. FIG. 2 illustrates the structure of an airbag 14 used in the airbag device 1 according to embodiment 1. FIG. 2(A) is a plan view illustrating the state in which the airbag 14 is unfolded (state prior to being stowed). FIG. 2(B) is a front view illustrating the state in which the airbag is rolled (state when stowed).

The airbag device 1 according to the present embodiment is equipped in a vehicle seat having a seat cushion 3 forming a seating surface and a seatback 2 forming a backrest. The airbag device 1 includes a pair of inflators 12a and 12b, which are stowed in the left and right sides of the seatback 2 and generate expansion gas, and an airbag 14 stowed in the seatback 2 in a rolled or folded state that is deployed by the expansion gas discharged from the inflators 12a and 12b. In the present embodiment, the seatback 2 includes an integrated headrest, but this airbag device can also be applied to seats equipped with a headrest as a separate member.

The airbag 14 is configured to deploy from the side of the seatback 2 forwards and includes a pair of left and right side chambers 16a and 16b for restraining movement at least from the waist to the shoulders of the occupant, and an upper chamber 18 that connects the pair of side chambers 16a and 16b, and is positioned above the head of the occupant when the airbag 14 is deployed. The side chambers 16a and 16b can be symmetrical in shape. The upper chamber 18 is positioned in the longitudinal center of the airbag 14 when in an unfolded state before stowing (FIG. 2) and is integrally molded using the same fabric as the side chambers 16a and 16b.

Figure 3:
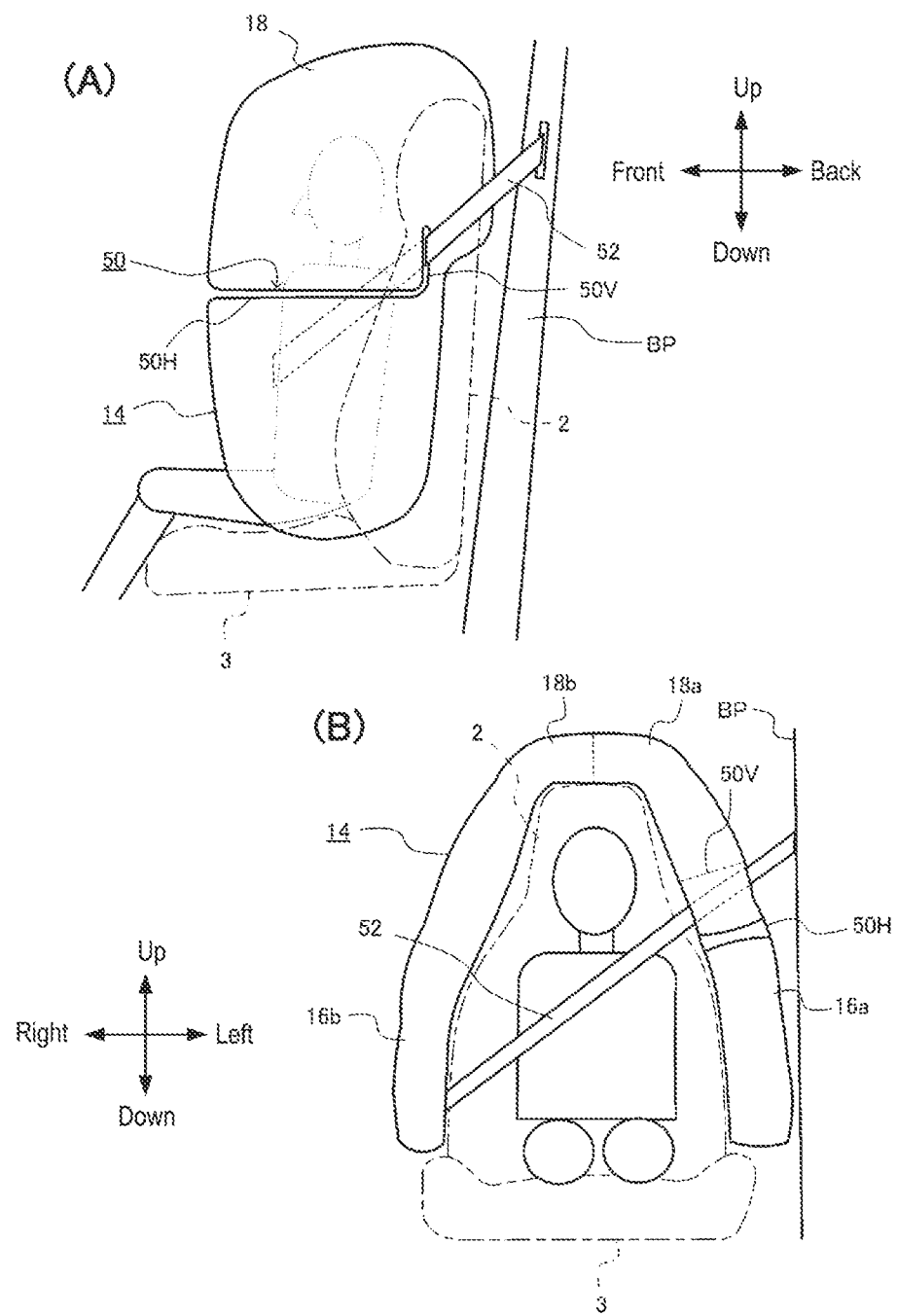
FIG. 3 illustrates the activated state (airbag deployed state) of the airbag device according to embodiment 1 of the present invention.

The upper chamber 18 of the airbag 14 includes a first region 18a in fluid communication with the side chamber 16a, and a second region 18b in fluid communication with the side chamber 16b. The upper chambers 18 (18a, 18b) then deploy from near the upper edge of the seatback 2 above the headrest and wrap around the occupant's head (FIG. 3). Here, the first region 18a and the second region 18b of the upper chamber 18 are mutually separated as chambers and have a structure blocking fluid flow.

The airbag device 1 in this embodiment is equipped with first connection members (tabs) 22a, 22b, 22c, and 22d for securing the rolled and compressed airbag 14 to the seatback 2. The first connection members 22a, 22b, 22c, and 22d are placed one above and one below the inflators 12a and 12b on the left and right sides of the seatback 2. The inflators 12a and 12b are introduced through the inflator introduction portions 20a and 20b of the airbag 14.

The airbag device 1 of this embodiment further includes second connecting members 24a and 24b in the form of a strip having a first end (24a1, 24b1) connected near the lower end of the airbag 14 in a stowed state and a second end (24a2, 24b2) connected to the side of the seat cushion 3, on both the left and right sides of the seat. The second connecting members 24a and 24b can be tethers formed using the same material (fabric) as the airbag 14. Here, the first ends (24a1, 24b1) of the second connecting members 24a and 24b are connected near the lower ends of the side chambers 16a and 16b in the deployed state.

Returning to FIG. 1, in the present invention, a folded portion 100 is formed by folding the portion corresponding to the upper chamber 18 of the long rod-shaped airbag 14, and the folded portion 100 is stowed above the seatback 2. The folded portion 100 (upper chamber 18) can then be deployed over the headrest to cover the upper part of the occupant's head, significantly reducing the possibility of damage to the occupant's head.

FIG. 3 illustrates the activated state (airbag 14 deployed state) of the airbag device 1 according to embodiment 1. FIG. 3(A) illustrates a view of the side of the vehicle in the width direction, and FIG. 3(B) illustrates a view from the front.

Here, on the left and right sides of the seatback 2, the side where a seatbelt 52 crosses near the shoulder is a first side, and the side opposite to the first side is a second side. In the case of the type where the seatbelt 52 is pulled out from the B-pillar (BP) in the front seat of the vehicle, the first side is the door trim side, or the so-called near side. However, in the case of the type where the seatbelt 52 is pulled out from near the shoulder of the seatback, the near side does not necessarily correspond to the first side.

Figure 4:
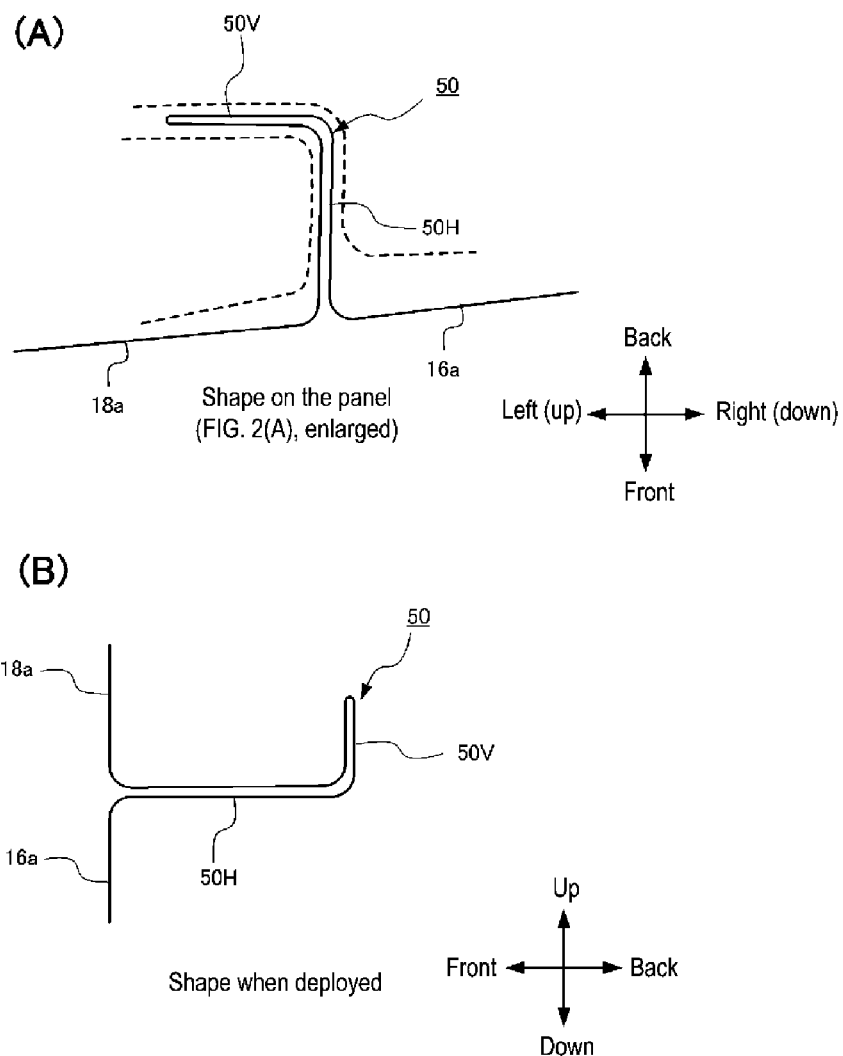
FIG. 4 is an explanatory diagram of a characteristic structural part (slit) of the airbag according to embodiment 1 of the present invention.

FIG. 4 is an explanatory diagram of a characteristic structural part (slit 50) of the airbag according to embodiment 1 of the present invention. FIG. 4(A) illustrates the shape of the slit 50 on the panel that makes up the airbag 14. FIG. 4(B) illustrates the shape of the slit 50 with the airbag 14 deployed.

In this embodiment, the slit 50 is formed near the boundary between the near-side side chamber 16a and the upper chamber 18, so that the seatbelt 52 fits inside the slit 50 when the airbag 14 is deployed. Therefore, when the airbag 14 deploys, presence of the seatbelt 52 will not impede deployment of the airbag 14.

As illustrated in FIG. 2, the slit 50 can be easily formed by cutting and sewing the panels that make up the airbag 14. Furthermore, by forming a relatively narrow slit 50, adverse effects such as reduction of the protection scope of the airbag 14 can be minimized. Furthermore, degradation of restraint performance caused by the airbag 14 being interrupted over a wide area around the slit 50 can be avoided.

As illustrated in FIG. 2(a), FIG. 3, and FIG. 4, the slit 50 includes a horizontal slit area 50H extending rearwardly from the front edge of the airbag 14 and a vertical slit area 50V extending upwardly from the rear end of the horizontal slit area 50H, forming a generally horizontal L shape when viewed from the vehicle width direction.

Thus, by forming a vertical slit area 50V connecting to the horizontal slit area 50H, the seatbelt 52 advancing from the front end of the horizontal slit area 50H will enter and be retained in the vertical slit area 50V when the seatbelt reaches the rearmost part of the horizontal slit area 50H. Therefore, the seatbelt 52 retained in the vertical slit area 50V at one end will not be dramatically expelled forward along the horizontal slit area 50H by the pressure of the airbag 14, and the restraint function of the occupant by the seatbelt 52 can be maintained.

Figure 5:
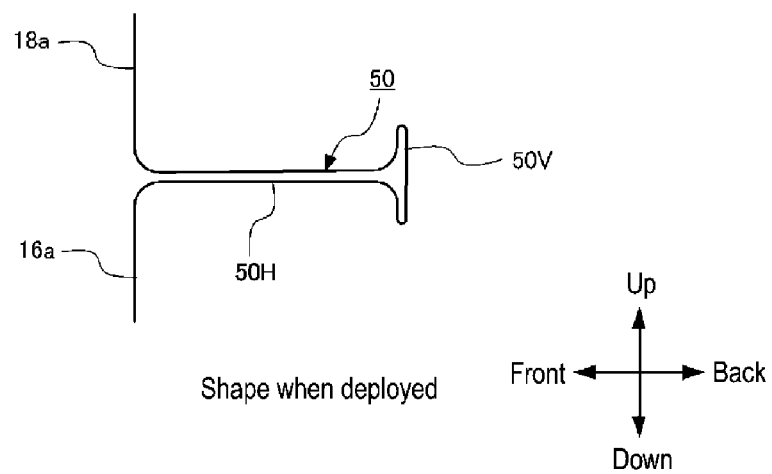
FIGS. 5(A) and (B) are explanatory diagrams illustrating another aspect of the characteristic structural part (slit) of the airbag according to the present invention.
Figure 5:
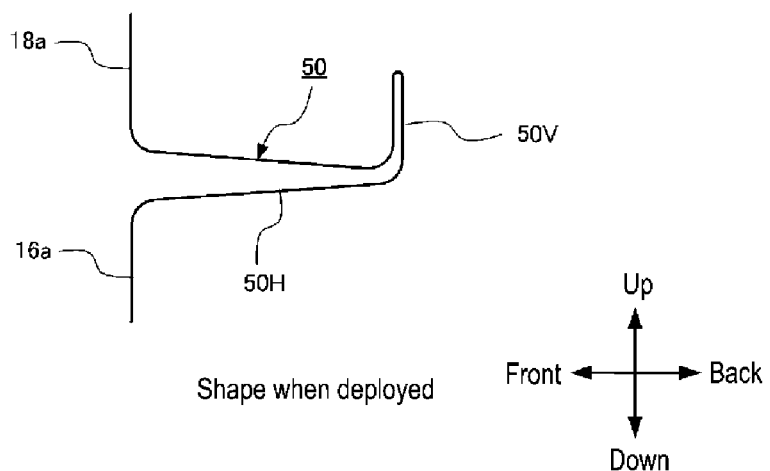

FIGS. 5(A) and 5(B) are explanatory diagrams illustrating another aspect of the slit 50 formed in the airbag 14 according to the present invention. As illustrated in FIG. 5(A), the slit 50 includes a horizontal slit area 50H extending rearwardly from the front edge of the airbag 14 and a vertical slit area 50V extending up and down from the rear end of the horizontal slit area 50H, forming a generally horizontal T shape when viewed from the vehicle width direction.

The slit 50 illustrated in FIG. 5(B) is formed in a tapered shape that gets narrower from the front end of the horizontal slit area 50H to the rear. In this manner, by widening the front end of the horizontal slit area 50H, the opening through which the seat belt 52 enters can be increased in size, enabling the seatbelt 52 to be securely captured.

Figure 6:
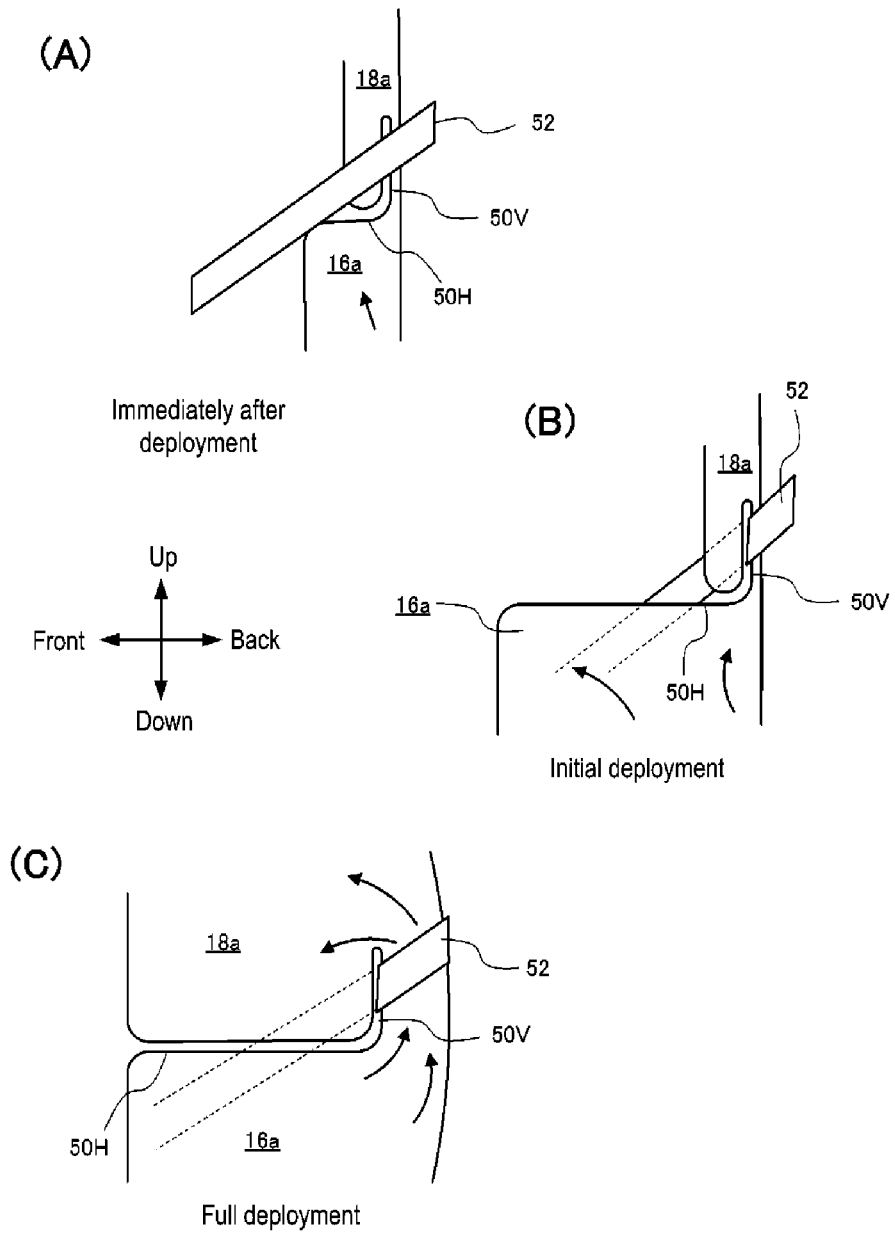
FIG. 6(A) to (C) are explanatory diagrams describing operation of the airbag device according to embodiment 1 of the present invention.

FIG. 6(A) to (C) are explanatory diagrams describing operation of the airbag device on the near side according to embodiment 1 of the present invention. FIG. 6(A) illustrates a state just after the airbag 14 is deployed. FIG. 6(B) illustrates an initial deployment state of the airbag 14. FIG. 6(C) illustrates a full deployment state of the airbag 14.

As illustrated in FIG. 6(A), in the stage immediately after the airbag 14 deploys, the seatbelt 52 begins to enter the horizontal slit area 50H of the airbag 14. Thereafter, as deployment of the airbag 14 progresses and reaches the initial stage of deployment, the seatbelt 52 moves backward in a relative manner as if sliding through the horizontal slit area 50H and enters the vertical slit area 50V as illustrated in FIG. 6(B). Note, in actuality, the seatbelt 52 does not move as it is the airbag 14 that deploys forward, but for convenience, the belt 52 may be described as moving backward in a relative manner.

When the seatbelt 52 reaches the slit 50V of the airbag 14, the inflow of expansion gas into the upper chamber 18 (18*a*) is blocked or restricted. In other words, deployment of the chamber positioned behind the slits (50H, 50V) is restricted, and only the side chamber 16*a* deploys dramatically.

Thereafter, as illustrated in FIG. 6(C), the expansion gas flows into the space behind the vertical slit area 50V as the internal pressure of the side chamber 16*a* rises, securing the flow path to the upper chamber 18 (18*a*) and expansion gas flows into the upper chamber 18 (18*a*).

Thus, deployment of the airbag 14 is restricted near the slits (50H, 50V) in the initial stage of deployment, thereafter, the locations corresponding to the slits (50H, 50V) are opened in conjunction with the internal pressure of the airbag 14, and the expansion gas flows from the side chamber 16*a* into the upper chamber 18 (18*a*) during the initial stage of operation of the airbag device. The side chamber 16*a* deploys first, quickly restraining movement of the occupant in the left and right directions and reliably absorbing lateral impacts.

Figure 7:
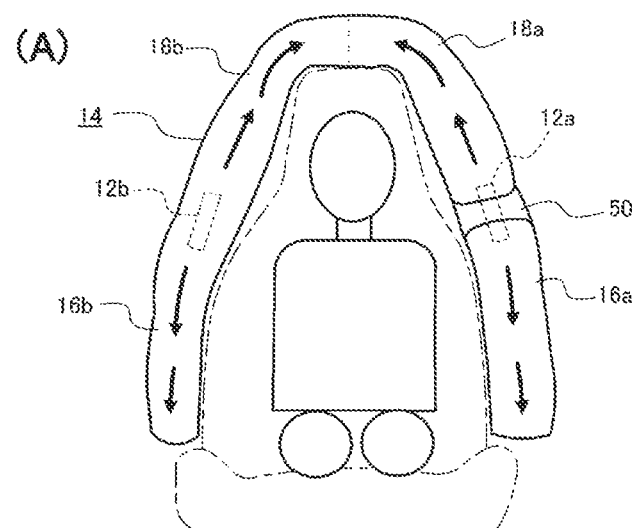
FIG. 7(A) is an explanatory diagram illustrating the flow of expansion gas of the airbag device according to embodiment 1 of the present invention.
FIG. 7(B) is an explanatory diagram illustrating the flow of expansion gas of the airbag device according to embodiment 2 of the present invention.
Figure 7:
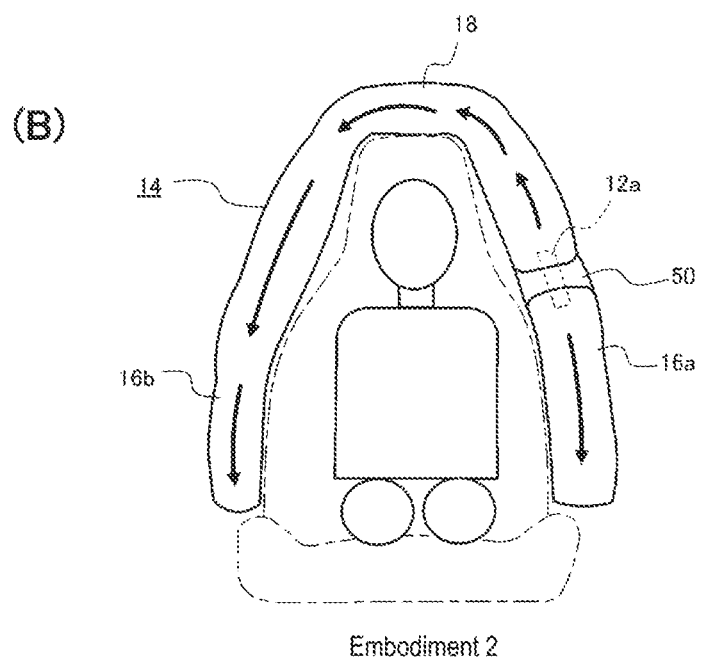

As illustrated in FIG. 7(A), on the right side of the vehicle seat, the expansion gas released from the inflator 12*b* is supplied to the side chamber 16*b* and the upper chamber 18*b*.

In the present embodiment, by dividing the upper chamber 18 into the first region 18*a* and second region 18*b*, the airbag 14 as a whole appears to be divided into two parts, left and right, and deployment of the left and right chambers (airbag) can be controlled independently.

Thus, it is important that the side chamber 16*a* deploys as quickly as possible in the event of a side collision, while the upper chamber 18 needs to protect the occupant's head in the event of a rollover, and the like. Therefore, in addition to rapid deployment, it is important that the chamber remains deployed for a long period of time.

In this embodiment, when a side collision occurs and the door trim enters the vehicle cabin, crushing the side chamber 16*a*, the gas inside the side chamber 16*a* flows into the upper chamber 18 (18*a*) as if being pushed out. As a result, the internal pressure of the upper chamber 18 (18*a*), which deploys slightly later, rises, allowing the upper chamber to remain deployed for a longer period of time than the side chambers 16*a*. This enables the head and neck area of the occupant to be securely restrained and protected even in the event of a rollover or the like type of event that occurs later chronologically.

FIG. 7(B) is an explanatory diagram illustrating expansion gas flow of the airbag device in embodiment 2 of the present invention. In the example illustrated in FIG. 7(B), the upper chamber 18 is not divided into left and right parts as in embodiment 1, but is configured as a single chamber. Alternatively, an internal vent (not shown) is formed at the boundary of the two divided regions (18*a*, 18*b*) as in embodiment 1, providing a fluidly connected structure.

The inflator 12*a* will be stowed only on the first side chamber 16*a* (near-side), and the expanding gas released from this inflator 12*a* will flow from the first side chamber 16*a*, through the upper chamber 18, and into the second side chamber 16*b*. Also, the inflator (12*b*) can be placed in the side chamber 16*b* to supply expansion gas from both sides.

In this embodiment, the upper chamber 18 and the side chambers 16*a* and 16*b* on both the left and right sides are completely (to the full extent) fluidly connected, so that the expansion gas flows from the side chamber 16*a* on the first side, through the upper chamber 18, and into the side chamber 16*b* on the second side. Therefore, when the airbag 14 is deployed, the first side chamber 16*a* is the first to deploy, followed by the upper chamber 18, and then the second side chamber 16*b*. For example, in the event of a side collision to the first side (near side), the first side chamber 16*a* to initially deploy can quickly protect the occupant.

Embodiment 3

Figure 8:
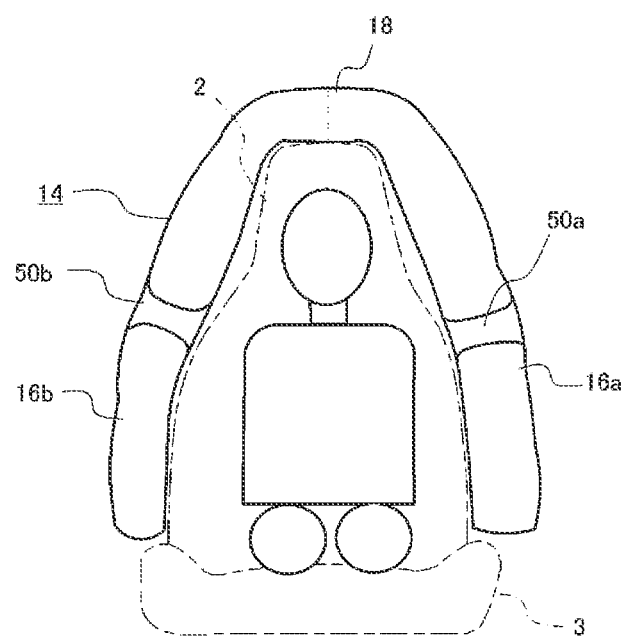
FIG. 8 is an explanatory diagram illustrating the activated state (airbag deployed state) of the airbag device according to embodiment 3 of the present invention as viewed from the front.
Figure 8:
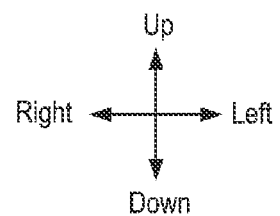

FIG. 8 is an explanatory diagram illustrating the activated state (airbag 14 deployed state) of the airbag device according to embodiment 3 of the present invention as viewed from the front. In this embodiment, the slits 50 (50*a*, 50*b*) employed in embodiment 1 and embodiment 2 are provided on both the left and right sides of the airbag 14.

This structure allows vehicle seats equipped with such airbag devices to be installed regardless of their position, such as near-side or far-side, thereby improving their versatility.

Embodiment 4

Figure 9:
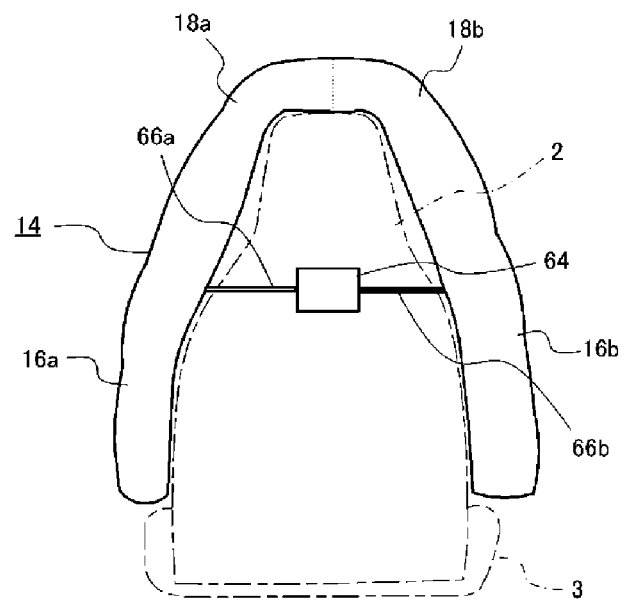
FIG. 9 is an explanatory diagram that describes the inflator arrangement of the airbag device according to embodiment 4 of the present invention schematically viewed from the back of the vehicle seat.
Figure 9:
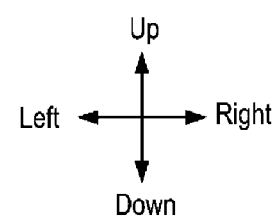

FIG. 9 is an explanatory diagram that describes the inflator arrangement of the airbag device according to embodiment 4 of the present invention, schematically viewed from the back of the vehicle seat. In this embodiment, an inflator 64 is placed at the back of the seatback 2. A disc type inflator can be employed instead of a cylinder type for the inflator 64. The expansion gas released from the inflator 64 is supplied to the left and right side chambers 16*a* and 16*b* through gas guides (channels) 66*a* and 66*b* such as pipes.

In this manner, use of the inflator 64 arranged on the back surface of the seatback enables flexible adjustment of the expansion gas flow path using a prescribed gas guide, and since there is relatively more space, an inflator with a larger capacity can be used.

The present invention has been described with reference to embodiments; however, the present invention is not limited to the embodiments described above. In other words, changes can be made as necessary without deviating from the scope of the technical concept of the invention.

The invention claimed is:

1. An airbag device for installation in a vehicle seat having a seat cushion forming a seat surface and a seatback forming a backrest, comprising:

an inflator that generates expansion gas; and
an airbag for deployment by expansion gas emitted from the inflator;
the airbag including a pair of left and right side chambers that deploy forward from the seatback and an upper chamber that is continuous with the side chambers and deploys forward above the side chambers,
the airbag including a recess for receiving a seatbelt,
wherein the recess is a slit that extends in a front-to-back direction when the airbag is deployed; and
wherein the slit includes a horizontal slit area extending in the front-to-back direction when the airbag is deployed and a vertical slit area extending in an upward direction from a back end of the horizontal slit area, and is formed in an L-shape as viewed from a vehicle width direction.

2. An airbag device for installation in a vehicle seat having a seat cushion forming a seat surface and a seatback forming a backrest, comprising:
an inflator that generates expansion gas; and
an airbag for deployment by expansion gas emitted from the inflator, the airbag including a pair of left and right side chambers that deploy forward from the seatback and an upper chamber that is continuous with the side chambers and deploys forward above the side chambers, the airbag including a recess for receiving a seatbelt,
wherein the recess is a slit that extends in a front-to-back direction when the airbag is deployed; and
wherein the slit includes a horizontal slit area extending in a front-to-back direction when the airbag is deployed and a vertical slit area extending up and down from a back end of the horizontal slit area, and is formed in an T-shape as viewed from a vehicle width direction.

3. The airbag device according to claim 1, wherein the horizontal slit area is formed in a tapered shape getting narrower from a front to a back.

4. An airbag device for installation in a vehicle seat having a seat cushion forming a seat surface and a seatback forming a backrest, comprising:
at least one inflator that generates expansion gas; and
an airbag for deployment by expansion as emitted from the at least one inflator, the airbag including a pair of left and right side chambers that deploy forward from the seatback and an upper chamber that is continuous with the side chambers and deploys forward above the side chambers, the airbag including a recess for receiving a seatbelt,
wherein the airbag is configured so that deployment of the recess is restricted by a seat belt during an initial stage of airbag deployment, and then the recess is opened as an internal pressure of the airbag increases.

5. The airbag device according to claim 1, wherein an upper part of the pair of side chambers is connected by the upper chamber.

6. The airbag device according to claim 5, wherein the recess is formed on one of the left and right side chambers, and the upper chamber of the one of the left and right side chambers includes a first region in fluid communication with the side chamber of the one of the left and right side chambers and a second region in fluid communication with the side chamber on of the other of the left and right side chambers and the first and second regions are fluidly separated from each other.

7. The airbag device according to claim 6, wherein the at least one inflator includes a pair of inflators stowed in the pair of side chambers.

8. The airbag device according to claim 7, wherein the airbag is configured such that the expansion gas emitted from the pair of inflators flows from the pair of side chambers into the first and second regions of the upper chamber.

9. The airbag device according to claim 5, where the recess is formed on one of the left and right side chambers, and wherein the upper chamber includes a first region in fluid communication with the side chamber on the one of the left and right side chambers a second region in fluid communication with the side chamber on the other of the left and right side chambers, and the first and second regions are mutually fluidly connected.

10. The airbag device according to claim 9, wherein the recess is formed in one of the left and right side chambers of the airbag and the at least one inflator is stowed in one of the left and right side chambers of the airbag.

11. The airbag device according to claim 10, wherein the airbag is configured so the expansion gas emitted from the at least one inflator flows from the side chamber on one of the left and right side chambers of the airbag, through the first region and second region of the upper chamber, and then to the side chamber on the other of the left and right side chambers of the airbag.

12. An airbag device for installation in a vehicle seat having a seat cushion forming a seat surface and a seatback forming a backrest, comprising:
an inflator that generates expansion gas; and
an airbag for deployment by expansion gas emitted from the inflator, the airbag including a pair of left and right side chambers that deploy forward from the seatback and an upper chamber that is continuous with the side chambers and deploys forward above the side chambers, the airbag including a recess for receiving a seatbelt,
wherein the recess is formed on one of the left and right side chambers of the airbag and a further recess is formed on the other of the left and right side chambers of the airbag.

13. The airbag device according to claim 6, wherein the at least one inflator includes a back surface inflator stowed on the back surface of the seatback.

14. The airbag device according to claim 13, wherein the airbag is configured so the expansion gas emitted from the at least one inflator flows at least into one of the side chamber on the left side chamber or the right side chamber.

15. The airbag device according to claim 1, in combination with the vehicle seat.

16. The airbag device according to claim 1, wherein the recess is formed on the first side of the airbag.

* * * * *